United States Patent [19]

Kilian, III

[11] Patent Number: 5,165,198

[45] Date of Patent: Nov. 24, 1992

[54] BAIT BAG AND DRAINAGE SYSTEM

[76] Inventor: Leo J. Kilian, III, 15920 Litten Way, Ramona, Calif. 92065

[21] Appl. No.: 672,360

[22] Filed: Mar. 20, 1991

[51] Int. Cl.$^5$ .............................................. A01K 97/00
[52] U.S. Cl. ........................................ 43/55; 383/41; 383/100
[58] Field of Search ............... 43/55, 56, 57; 119/3; 224/920; 383/26, 41, 100, 103, 3, 901, 906

[56] References Cited

U.S. PATENT DOCUMENTS

| | | | |
|---|---|---|---|
| 636,381 | 11/1899 | Hamel | 224/920 |
| 706,407 | 8/1902 | Hall . | |
| 738,726 | 9/1903 | Lytle . | |
| 1,341,157 | 5/1920 | Sublett | 383/41 |
| 1,555,467 | 9/1925 | Graham | 383/41 |
| 1,581,072 | 4/1926 | Lumsden | 383/100 |
| 1,822,190 | 9/1931 | Ziele | 383/100 |
| 1,996,279 | 4/1935 | Dillon | 4/292 |
| 1,996,303 | 4/1935 | McConnell | 43/55 |
| 2,001,468 | 5/1935 | Moutoux | 43/55 |
| 2,055,912 | 9/1936 | Schonger | 43/56 |
| 2,303,757 | 12/1942 | Pierson | 119/5 |
| 2,309,534 | 8/1941 | Powell | 43/56 |
| 2,757,916 | 8/1956 | Osborn | 261/121 |
| 3,145,500 | 8/1964 | French | 43/103 |
| 3,334,438 | 8/1967 | Fellers | 43/56 |
| 3,339,305 | 9/1967 | Smith | 43/56 |
| 3,351,328 | 11/1967 | Vetterli | 261/112 |
| 3,449,855 | 5/1969 | Hassell | 43/56 |
| 3,499,243 | 3/1970 | Artin | 43/56 |
| 3,710,502 | 1/1973 | Bracey | 43/56 |
| 3,716,938 | 2/1973 | Ammons | 43/55 |
| 4,297,804 | 11/1981 | Weld | 43/55 |
| 4,751,752 | 6/1988 | Ewing | 4/287 |
| 4,772,278 | 9/1988 | Baber | 383/100 |

FOREIGN PATENT DOCUMENTS 0046751 12/1974 Japan ..................... 383/41

OTHER PUBLICATIONS

Aqua World Brochure entitled "Super Live Bait Containers", (undated).

*Primary Examiner*—Richard K. Seidel
*Assistant Examiner*—James Miner
*Attorney, Agent, or Firm*—Baker, Maxham, Jester & Meador

[57] ABSTRACT

A bait bag and drainage system for storing and transporting live bait on a vessel includes a bag having a bottom, a top and one or more sides defining a fluid carrying chamber, an attachment system for attaching the bag to the vessel, a drainage system for controllably draining fluid from the bag, and the drainage system including an anti-clog system therein for preventing the drainage system from becoming substantially clogged with bait fish or other matter in the bag such that the bag overflows and bait is lost.

10 Claims, 4 Drawing Sheets

BAIT BAG AND DRAINAGE SYSTEM

BACKGROUND OF THE INVENTION

The present invention relates to containers for carrying live bait for fishing, and more particularly, to bait bags adapted to be suspended over the gunwale of a boat to provide a water storage medium for live bait for use in sport fishing and the like.

FIGS. 1 and 2 externally illustrate a prior art belt bag construction.

Bait bags adapted to be suspended from the rear of a boat for carrying live bait have been used extensively by sport fisherman, particularly for ocean fishing. Suspended bait bags typically include a metal framework to which is connected a water-containing bag formed from a durable woven material such as a polyester weave, which serves as a storage and transport tank for the bait. The metal framework is suspended from the rear of the boat, above the water line. A pump is used to circulate water into the bag. Water drainage is provided by a plurality of apertures in the rear of the bag.

The drainage apertures in the rear of the bait bag are typically formed with brass grommets which define the aperture and prevent the formation of tears in the bag material. It almost invariably occurs, however, that the apertures become clogged with bait or other matter that may accumulate in the bait bag. When this occurs, the drainage apertures cannot perform their intended function and the bait bag will overflow, causing the bait to be washed over and lost. In a typical fishing expedition, it is not uncommon to lose as much as half the bait originally placed in the bag.

Accordingly, a need exists for an improved bait bag and bait bag drainage system which provides proper drainage, which prevents bait loss and preserves the bait in an efficient manner and which may be economically implemented in new and existing bait bags.

SUMMARY OF THE INVENTION

In accordance with the foregoing objects, the present invention is directed to an improved bait bag and drainage system having a tendency not to clog and to ensure proper water drainage and bait preservation during transport. To that end, preferred embodiments of the invention may include a water and bait containing structure adapted to be mounted on a boat. The containing structure may include a water drainage system having incorporated therewith an anti-clog system for preventing bait from clogging the drainage system and causing the bait bag to overflow. The anti-clog system may include one or more bait bag screens having an extension directed toward the interior of the bait bag that provides a drain surface which cannot be clogged by standard size bait.

BRIEF DESCRIPTION OF THE DRAWING

The objects, features and advantages of the present invention will be further appreciated from the Detailed Description of Preferred Embodiments hereinafter set forth when considered in conjunction with the accompanying Drawing, in which.

DESCRIPTION OF THE PREFERRED EMBODIMENT

Figure 1:
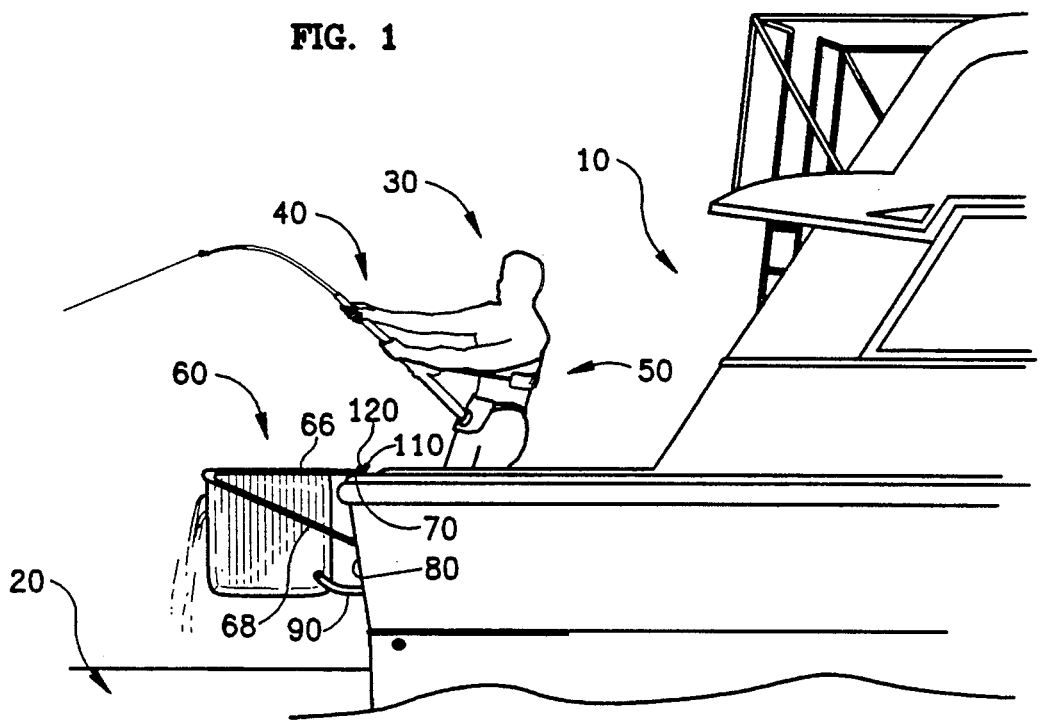
FIG. 1 is a diagrammatic side view of a fishing vessel having a live bait carrying bag attached to the stern gunwale thereof.

Referring now to FIG. 1, a fishing vessel 10 afloat in body of water 20 provides support for an individual 30 engaged in the act of fishing using a fishing pole 40 and, optionally, associated harness equipment 50 of conventional design. A bait bag assembly 60 is mounted to the stern gunwale 70 and stern wall 80 of the vessel 10, above the level of the water 20. Water is provided to the bait bag assembly 60 through an inlet line 90 that is connected to a water pump (not shown) in the vessel 10.

Figure 2:
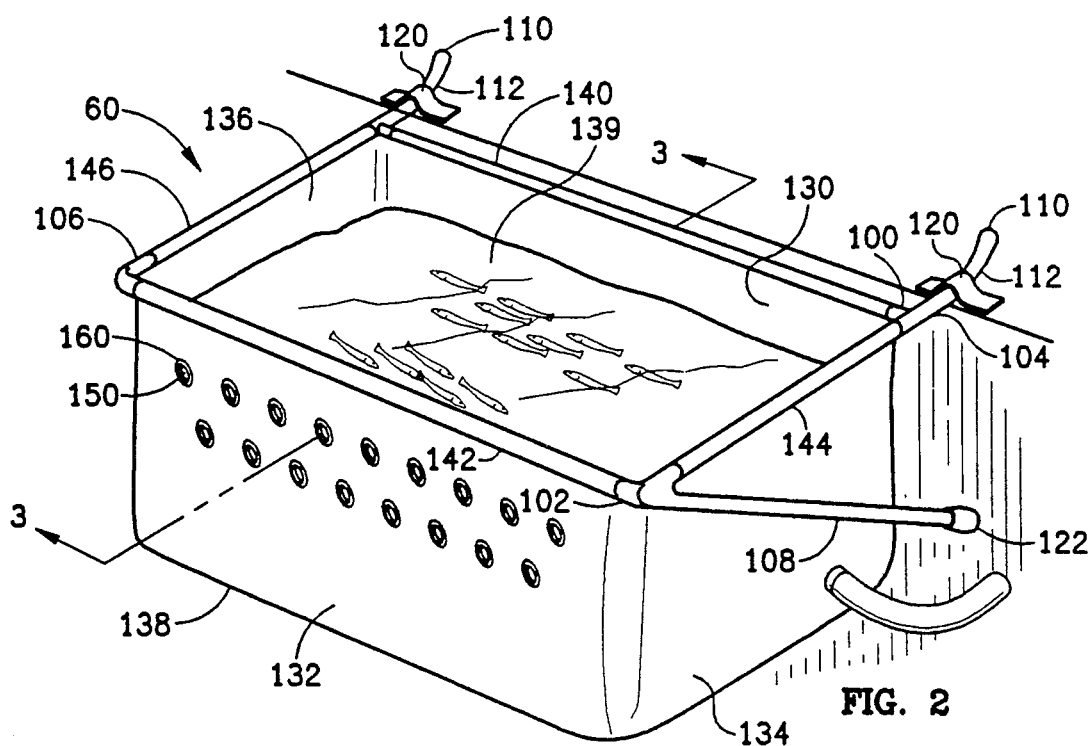
FIG. 2 is a partial diagrammatic projected view of the live bait carrying bag shown in FIG. 1.

As shown in more detail in FIG. 2, the bait bag assembly 60 has a vessel attachment system for attaching the bait bag assembly to the vessel 10 that includes a frame having forward and rearward transverse frame members 100 and 102 extending parallel to each other. The frame further includes a pair of upper longitudinal frame members 104 and 106 extending forwardly from the rearward transverse frame 102 member and parallel to each other, and a pair of lower longitudinal frame members 108 and 109 extending forwardly and downwardly from the rearward transverse frame member 102 and parallel to each other. The upper longitudinal frame members 104 each extend to a forward terminus 110 that includes an upward bend 112. Although a frame is provided in FIGS. 1 and 2 for use in attaching the bait bag assembly to the vessel 10, it will be appreciated that many other methods of attachment could be employed.

The frame is secured to the vessel 10 using a pair of conventional mounting clamps 120 that extend over the upper longitudinal frame members 104 and are secured to the stern gunwale 70 by conventional fasteners. Vertical frame support and positioning is aided by the lower longitudinally extending frame members 108. These frame members include a resilient cover 122 over the forward ends thereof which contact the stern wall 80 of the vessel 10. The upward bend 112 of the upper longitudinal frame members prevents the frame from sliding rearwardly out of attachment with the clamps 120 while the frame is so positioned. The frame can be readily removed from the clamps 120, however, by lifting the transverse frame member 102 upwardly to pivot the frame and enable the terminus portions of the upper longitudinal frame members to be pulled through the clamps 120.

The bait bag assembly 60 further includes a bag made from a flexible, durable woven material such as a polyester weave. A variety of other materials could be used. Such materials also could be nonflexible, such as fiberglass, in which case the frame described above may not be necessary. Nonflexible materials, however, may be awkward to store. The bag includes a forward wall 130, a rearward wall 132, a pair of side walls 134 and 136, a bottom 138 and an open top 139 defining in combination a fluid carrying chamber. The side walls 134 and 136, and the bottom 138 are thin relative to their cross-sectional area such that the bag is a shell-like structure. To attach the bag to the frame, the upper edges of each of the walls 130, 132, 134 and 136 are folded over the respective frame members 100, 102, 104 and 106 and affixed to the walls to form attachment loops 140, 142, 144 and 146, respectively. The wall 132 further includes a drainage system having plurality of apertures 150 each of which may have conventional brass grommets 160 therein to prevent rips and tears in the bag. Many other drainage systems could also be employed, as for example, a system having only a single aperture or systems having apertures at other locations.

Figure 3:
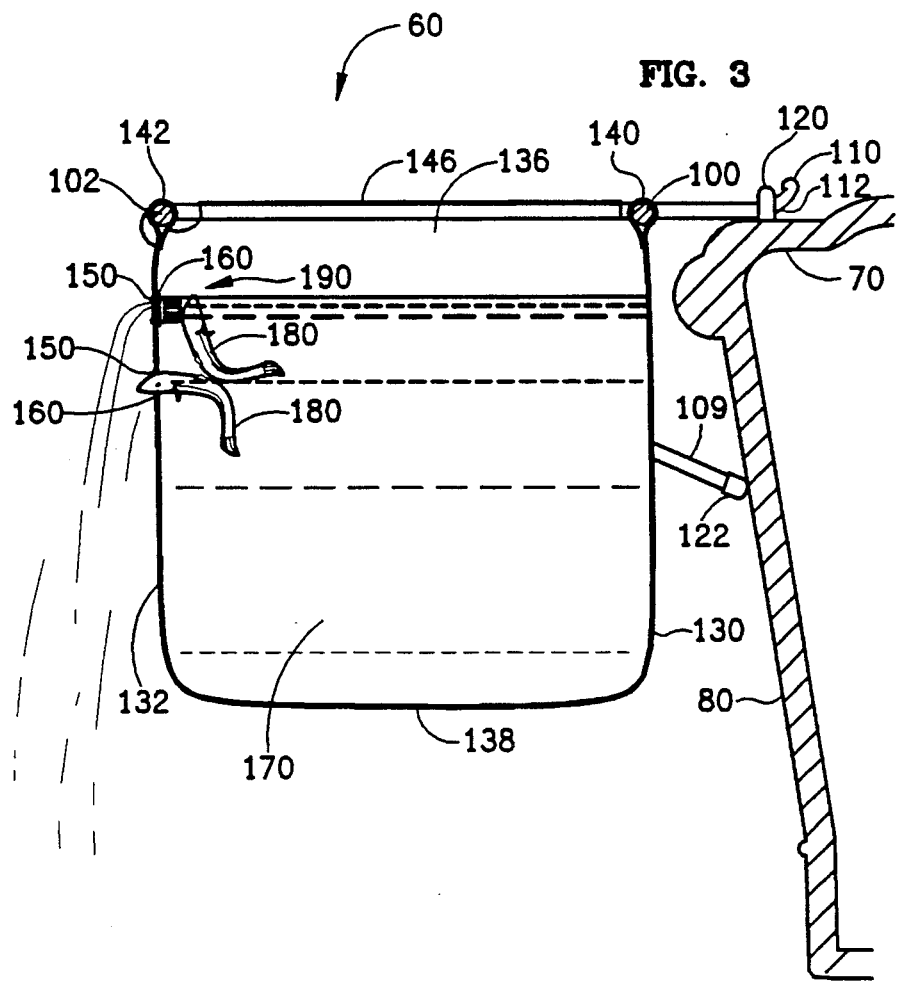
FIG. 3 is cross-sectional side view of the bait bag of FIGS. 1 and 2, taken along line 3—3 in FIG. 2 showing a bait bag screen constructed in accordance with the present invention mounted thereto.

Referring now to FIG. 3, the bait bag assembly 60 functions to support a reservoir of water 170 in the bait bage fluid carrying chamber containing one or more live bait fish 180 for transport on the vessel 10 to a fishing site. In FIG. 3 there is shown a lower aperture 150 and grommet 160 of conventional design which does not have an anti-clog system and which is clogged with a bait fish 180. In the upper aperture 150 and grommet 160 there is mounted an anti-clog system that includes a bait bag screen assembly 190 constructed in accordance with the present invention.

Figure 4:
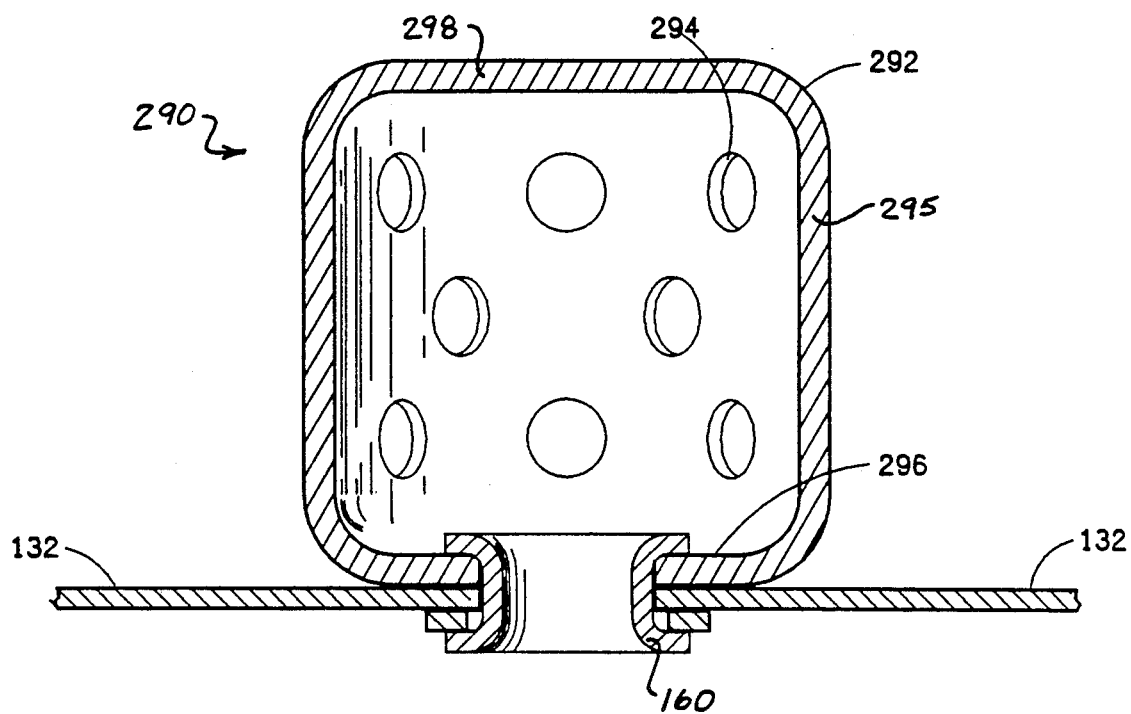
FIG. 4 is a detailed side view of a bait bag screen constructed in accordance with one aspect of the present invention for mounting on the bait bag of FIG. 1.

As shown in more detail in FIG. 4, the bait bag screen 290 includes a basket 292 having a plurality of apertures 294 therein. The apertures may be formed in many shapes and sizes and are shown in FIG. 4 as being circular. Apertures of other shapes, such as slots, elipses, etc., could no doubt also be used. The basket 292 may also be formed in many shapes and sizes and is shown in FIG. 4 as having a plurality of connected side wall portions 195 extending to an end portion 198. Baskets of other shapes, such as cylinders, frustocones, domes, spheres, parabolids, etc., could no doubt also be used, as shown in FIGS. 5-11. In general, however, the basket 192 need only shaped so as to extend inwardly from the wall 132 an amount sufficient to prevent bait fish from substantially blocking the flow of water through the aperture 150 such that the water reservoir 170 does not overflow the top of the bait bag.

In the bait bag screen of FIG. 4, the basket 292 is mounted to the grommet 160 by means of a generally annular base flange 296. The base flange is configured to extend inwardly between the grommet halves prior to assembly of the grommet. The grommets are then joined in conventional fashion with the flange 296 secured therebetween. Thus, the bait bag screen of FIG. 4 may be permanently mounted during the bait bag fabrication process and would be expected to remain on the bait bag throughout the life of the bag.

Figure 5:
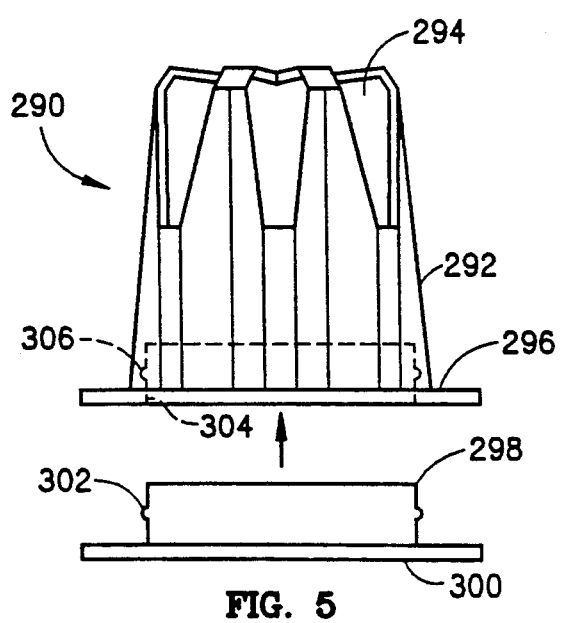
FIG. 5 is a detailed side view of a bait bag screen constructed with another aspect of the present invention.

Alternatively, as shown in FIG. 5, the bait bag screen 290 may be adapted for removable or permanent attachment to an exiting bait bag having apertures and grommets or having apertures only and no grommets. Thus, the screen 290 includes a separable retainer 298 having a generally annular flange 300 and a projection 302. In addition, the bait bag screen 290 includes a socket 304 for receiving the retainer 298. The socket 304 is provided with a groove 306 for receiving the detent ring 302. To mount the screen 290 to the bait bag, the retainer 298 and the socket 304 are joined with the bait bag material or grommet 160 disposed therebetween. The retainer and socket are pressed together until the projection 302 locks in the recess 306.

Figure 6:
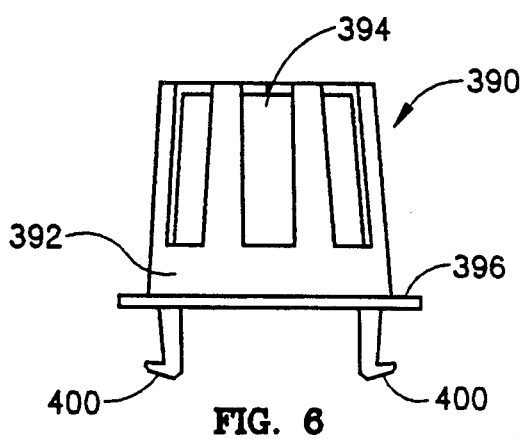
FIG. 6 is a detailed side view of a bait bag screen constructed with another aspect of the present invention.

Alternatively, as shown in FIG. 6, the bait bag screen 390 may be adapted solely for mounting to a bait bag with conventional grommets. Thus, the bai bag screen 390 has a base 392 and a plurality of lock tabs 400 extending from the base flange 396. The lock tabs 400 are adapted to extend through an existing grommet 160 and affix the screen to the bag by locking the grommet 160 between the lock tabs 400 and the base flange 396. The lock tabs 400 could be formed in many shapes including halfmoons, or could be formed as a series of barbed prongs extending around a portion of the base flange 396.

Figure 7:
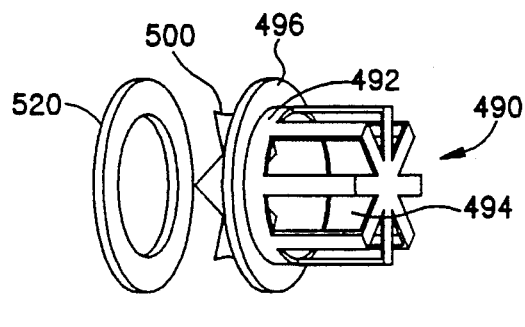
FIG. 7 is a detailed side view of a bait bag screen constructed with another aspect of the present invention.

Additional embodiments of the present invention are shown in FIGS. 7-12. In FIG. 7, the bait bag screen 490 includes a plurality of locking flanges 500 and a retaining collar 520. The screen 490 is mounted to the bait bag by arranging the base flange 496 and the retaining collar 520 on opposing sides of the bait bag material or grommet 160, securing the locking flanges 500 through the interior of the collar 520 and bending the locking flanges over the face of the collar to lock the bait bag material or grommet 160 securely between the base flange 496 and the retaining collar 520.

Figure 8:
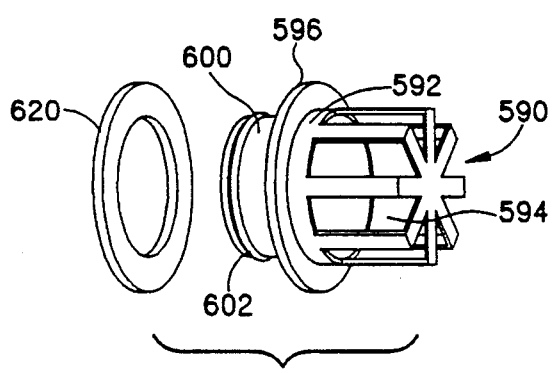
FIG. 8 is a detailed side view of a bait bag screen constructed with another aspect of the present invention.

In FIG. 8, the bait bag screen 590 includes a generally cylindrical retainer 600 extending from the base flange 596 and a retaining collar 620. The retainer 600 includes a snap ring 602 extending around the surface thereof. The screen 590 is mounted to the bait bag by arranging the base flange 596 and the retaining collar 620 on either side of the bait bag material or grommet 160 and inserting the retainer 600 and the snap ring 602 through the collar 620 to lock the bait bag material or grommet 160 securely between the base flange 596 and the retaining collar 620.

Figure 9:
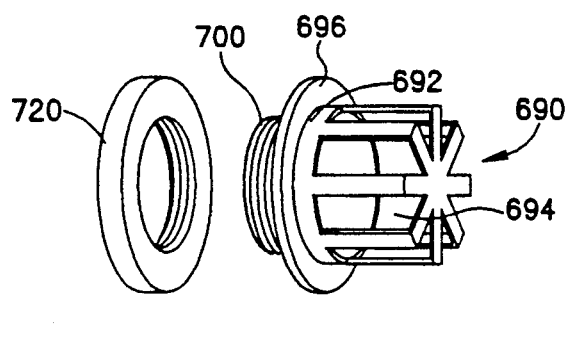
FIG. 9 is a detailed side view of a bait bag screen constructed with another aspect of the present invention.

In FIG. 9, the bait bag screen 690 includes a threaded generally cylindrical retainer 700 extending from the base flange 696 and an internally threaded retaining collar 720. The screen 690 is mounted to the bait bag by arranging the base flange 696 and the retaining collar 720 on either side of the bait bag material or grommet 160 and threading the base flange and retaining collar together to lock the bait bag material or grommet 160 securely between the base flange 696 and the retaining collar 720.

Figure 10:
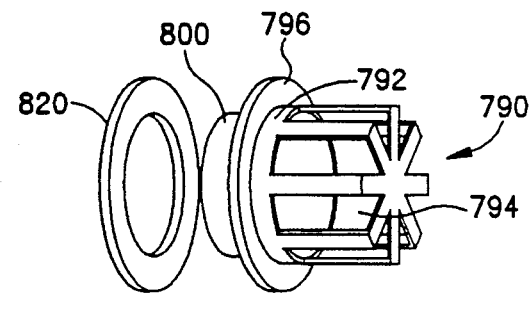
FIG. 10 is a detailed side view of a bait bag screen constructed with another aspect of the present invention.

In FIG. 10, the bait bag screen 790 includes a generally cylindrical retainer 800 extending from the base flange 796 and a retaining collar 820. The screen 790 is mounted to the bait bag by arranging the base flange 796 and the retaining collar 820 on either side of the bait bag material or grommet 160 and applying a cementitious compound that seals the base flange and retaining collar together to lock the bait bag material or grommet 160 securely between the base flange 796 and the retaining collar 820.

Figure 11:
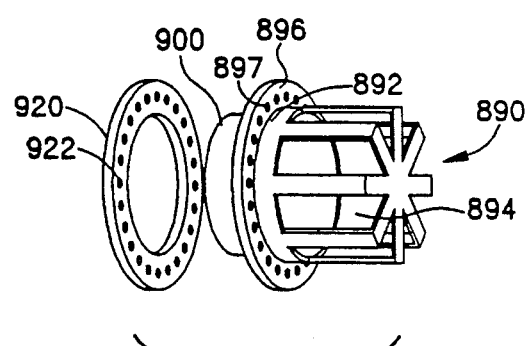
FIG. 11 is a detailed side view of a bait bag screen constructed with another aspect of the present invention.

In FIG. 11, the bait bag screen 890 includes a generally cylindrical retainer 900 extending from the base flange 896 and a retaining collar 920. The base flange 896 and the retaining collar 920 both include a plurality of holes 897 and 922, respectively, formed on mutually aligned portions thereof. The screen 890 is mounted to the bait bag by arranging the base flange 896 and the retaining collar 920 on either side of the grommet 160 and sewing the base flange and retaining collar together through the holes 897 and 922 to lock the grommet 160 securely between the base flange 896 and the retaining collar 920.

Figure 12:
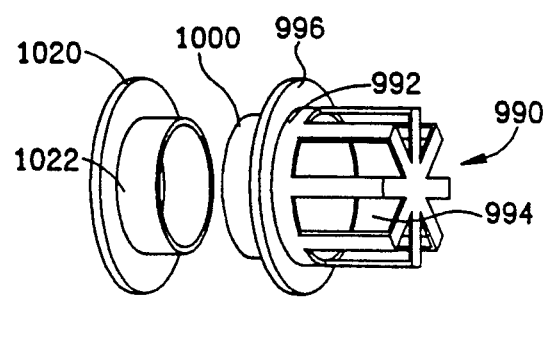
FIG. 12 is a detailed side view of a bait bag screen constructed with another aspect of the present invention.

In FIG. 12, the bait bag screen 990 includes a generally cylindrical retainer 1000 extending from the base flange 996 and a retaining collar 1020. The retaining collar 1020 also includes a cylindrical retainer 1022 that is sized to slideably engage the cylindrical retainer 1000. The screen 990 is mounted to the bait bag by arranging the base flange 996 and the retaining collar 1020 on either side of the bait bag material or grommet 160 and applying a cementitious compound to the exterior surface of the cylindrical retainer 1022 and sealing the cylindrical retainers in mutual engagement to lock the bait bag material grommet 160 securely between the base flange 996 and the retaining collar 1020.

Accordingly, a novel bait bag and drainage system has been shown and described. Although several preferred embodiments have been disclosed, it should be understood that modifications and adaptations thereof will occur to persons skilled in the art. For example, we have shown that the bait bag screens may be of many shapes and sizes and may be mounted to the bait bag during manufacture, or could be mounted thereafter as an add-on item. The bait bag screens could also be integrally formed with the bait bag in cases where the bait bag material so allows. Many other mounting methods and screen designs will no doubt also be envisioned in light of the teachings herein. Such modifications and improvements are all contemplated within the scope of present invention and the protection afforded the invention is not to be limited, except in accordance with the spirit of the appended claims and their equivalents.

I claim:

1. In a fishing vessel having a stern gunwale and a stern wall, an improvement in combination therewith comprising:
    a bait bag having a bottom, a top, a front wall, a rear wall and a pair of side walls defining a fluid cavity said bait bag further having a plurality of loops formed on the top of said walls;
    a bait bag frame extending through said bait bag loops for supporting said bait bag, said frame having a pair of upper attachment legs and a pair of lower attachment legs;
    a pair of mounting clamps mounted on said stern gunwall, said upper attachment legs extending through said mounting clamps and said lower attachment legs extending to said stern wall;
    a plurality of drainage apertures disposed in the rear wall of said bait bag;
    a plurality of bait bag screens mounted in said drainage apertures, said bait bag screens including an apertured basket portion extending inwardly into said fluid chamber, said bait bag screens further including a flange mounted to said basket portion, said flange being mounted adjacent said rear bait bag wall; and
    means for mounting said bait bag screens to said bait bag rear wall.

2. A bait bag and drainage system for storing and transporting live bait on a vessel, comprising:
    a bag having a bottom, a top and one or more sides defining a fluid carrying chamber;
    an attachment system for attaching the bag to a vessel;
    a drainage system for controllably draining fluid from the bag, said drainage system including one or more drainage apertures formed in said bag, and an anti-clog system for preventing the drainage system from becoming substantially clogged with bait fish or other matter in the bag such that the bag overflows and the bait is lost; and
    said anti-clog system including one or more bait bag screens mounted to said one or more drainage apertures, said bait bag screens having a basket portion extending inwardly into said bag and a base flange, said drainage apertures further including a grommet having two grommet components, said base flange of said bait bag screens being mounted between said grommet components.

3. A bait bag and drainage system for storing and transporting live bait on a vessel, comprising:
    a bag having a bottom, a top and one or more sides defining a fluid carrying chamber;
    an attachment system for attaching the bag to a vessel;
    a drainage system for controllably draining fluid from the bag, said drainage system including one or more drainage apertures formed in said bag, and an anti-clog system for preventing the drainage system from becoming substantially clogged with bait fish or other matter in the bag such that the bag overflows and the bait is lost; and
    said anti-clog system including one or more bait bag screens mounted to said one or more drainage apertures, said bait bag screen shaving a basket portion extending inwardly into said bag, a base flange and a socket, said bait bag screens further including a retainer adapted to mount in said socket, said retainer being mounted in said socket with said bait bag disposed between said bait bag screen basket portion and said retainer.

4. A bait bag and drainage system for storing and transporting live bait on a vessel, comprising:
    a bag having a bottom, a top and one or more sides defining a fluid carrying chamber;
    an attachment system for attaching the bag to a vessel;
    a drainage system for controllably draining fluid from the bag, said drainage system including one or more drainage apertures formed in said bag, and an anti-clog system for preventing the drainage system from becoming substantially clogged with bait fish or other matter in the bag such that the bag overflows and the bait is lost; and
    said anti-clog system including one or more bait bag screens mounted to said one or more drainage apertures, and wherein said drainage apertures includes grommets, said bait bag screens having a basket portion extending inwardly into said bag, a base flange and a plurality of lock tabs to lock said bait bag screens to said grommets, over said drainage apertures.

5. A bait bag and drainage system for storing and transporting live bait on a vessel, comprising:
   a bag having a bottom, a top and one or more sides defining a fluid carrying chamber;
   an attachment system for attaching the bag to a vessel;
   a drainage system for controllably draining fluid from the bag, said drainage system including one or more drainage apertures formed in said bag, and an anti-clog system for preventing the drainage system from becoming substantially clogged with bait fish or other matter in the bag such that the bag overflows and the bait is lost; and
   said anti-clog system including one or more bait bag screens mounted to said one or more drainage apertures, said bait bag screens having a basket portion extending inwardly into said bag, a base flange and a retainer extending from said base flange, said bait bag screens further including a collar sized to mount over said retainer, said collar being mounted on said retainer with said bait bag disposed between said bag screens base flange and said collar.

6. A bait bag screen for a bait bag having a top, a bottom and a plurality of relatively thin side walls, comprising:
   an apertured basket having a base, a top and one or more side walls;
   a base flange attached to the base of said basket; and
   means for mounting said bait bag screen to a relatively thin bait bag wall, said mounting means including a socket formed in said basket having one or more recesses therein and a separate flanged retainer having one or more projections thereon, said flanged retainer being sized to slideably engage said socket and said projections being sized and positioned to engage said recesses when said flanged retainer is engaged in said socket.

7. A bait bag screen for a bait bag having a top, a bottom and a plurality of relatively thin side walls, comprising:
   an apertured basket having a base, a top and one or more side walls;
   a base flange attached to the base of said baskets; and
   means for mounting said bait bag screen to a relatively thin bait bag wall, said mounting means including a plurality of lock tabs extending from said base flange.

8. A bait bag screen for a bait bag having a top, a bottom and a plurality of relatively thin side walls, comprising:
   an apertured basket having a base, a top and one or more side walls;
   a base flange attached to the base of said basket; and
   means for mounting said bait bag screen to a relatively thin bait bag wall, said mounting means including a plurality of locking flanges extending from said base flange and a separate retaining collar sized to be slideably positionable over said locking flanges, said locking flanges being bendably positionable over said retaining collar when said collar is slideably positioned over said locking flanges to retain said collar adjacent said base flange.

9. A bait bag screen for a bait bag having a top, a bottom and a plurality of relatively thin side walls, comprising:
   an apertured basket having a base, a top and one or more side walls;
   a base flange attached to the base of said basket; and
   means for mounting said bait bag screen to a relatively thin bait bag wall, said mounting means including a generally cylindrical retainer extending from said base flanges and a separate retaining collar sized to be slideably positionable over said generally cylindrical retainer, said generally cylindrical retainer including a snap ring for securing said retaining collar on said generally cylindrical retainer adjacent said base flange.

10. A bait bag screen for a bait bag having a top, a bottom and a plurality of relatively thin side walls, comprising:
    an apertured basket having a base, a top and one or more side walls;
    a base flange attached to the base of said basket; and
    means for mounting said bait bag screen to a relatively thin bait bag wall, said mounting means including a generally cylindrical retainer extending from said base flange and a separate retaining collar, said retaining collar being sized to be slideably positionable over said generally cylindrical retainer, and said base flange sand said retaining collar including a plurality of holes therein positioned for mutual co-alignment and for sewing said retainer and said base flange in adjacent relationship.

* * * * *